United States Patent [19]

Koike et al.

[11] Patent Number: 4,689,078

[45] Date of Patent: Aug. 25, 1987

[54] RECORDING LIQUID

[75] Inventors: Shoji Koike; Kazuo Iwata, both of Yokohama, Japan

[73] Assignee: Canon Kabushiki Kaisha, Tokyo, Japan

[21] Appl. No.: 901,818

[22] Filed: Aug. 29, 1986

[30] Foreign Application Priority Data

Sep. 2, 1985 [JP] Japan ................................. 60-192106

[51] Int. Cl.$^4$ .............................................. C09D 11/00
[52] U.S. Cl. ........................................ 106/22; 106/23; 106/308 Q
[58] Field of Search ..................... 106/22, 23, 308 Q

[56] References Cited

U.S. PATENT DOCUMENTS 4,247,458  1/1981  Shuttleworth ...................... 534/857

FOREIGN PATENT DOCUMENTS 50-59108  5/1975  Japan .
1378773  12/1974  United Kingdom .

Primary Examiner—Amelia B. Yarbrough
Attorney, Agent, or Firm—Fitzpatrick, Cella, Harper & Scinto

[57] ABSTRACT

A recording liquid comprising a liquid composition containing a disperse dye is provided in which the purity of the disperse dye is 90% or higher. The recording liquid is useful for an ink jet recording system.

20 Claims, No Drawings

RECORDING LIQUID

BACKGROUND OF THE INVENTION

1. Field of the Invention

The present invention relates to a recording liquid, hereinafter simply called ink, for use in recording on a recording material such as paper or plastic film by an ink jet recording process or with a writing tool such as a fountain pen or a felt pen, or in printing on a textile or a non-woven cloth containing synthetic fibers by an ink jet recording process.

2. Related Background Art

Recording by an ink jet recording process is conducted by forming ink droplets through various ink ejecting methods and attaching all or a part of said droplets onto a recording material such as paper, plastic film or textile, and as the ink for such an ink jet recording process, there are already known and employed solutions and dispersions of various water-soluble dyes and pigments in water or in a liquid composed of water and water-soluble organic solvents.

Similar inks are also employed for writing tools such as fountain pens, felt pens, ball-point pens or the like.

Such conventional inks are naturally required to have various performances, but a most prominent requirement is the stability of liquid which ensures no clogging and no deposit at the nozzle, orifice or pen tip of a recording apparatus in case the recording with the ink is interrupted or such recording is not conducted for a prolonged period. This requirement is particularly important in an ink jet recording process utilizing thermal energy among various ink jet recording processes, since deposit formation tends to occur on the surface of the thermal head due to temperature changes. However conventional inks are liable to cause clogging in the nozzle or orifice or deposit on the surface of thermal head of the ink jet recording apparatus, or to form sediment during prolonged storage, because such ink usually contains various additive materials in order to satisfy various requirements such as ink ejecting conditions, shelf life, sharpness and density of recorded images, surface tension and electrical properties, and also because the dyes or pigments employed in such inks contain various impurities, Such drawback of the ink has been one of the reasons of rather low popularity of the ink jet refording process despite of various advantages thereof.

SUMMARY OF THE INVENTION

In consideration of the foregoing, a principal object of the present invention is to avoid the above-explained drawbacks of the prior art and to provide a highly stable ink which does not cause clogging in a pen tip, a nozzle or an orifice during recording or prolonged storage even with a high dye concentration, and in particular, does not form deposit on the thermal head of an ink jet recording apparatus utilizing thermal energy.

According to an aspect of the present invention, there is provided a recording liquid comprising a liquid composition containing a disperse dye, the purity of said disperse dye being 90% by weight or higher.

According to another aspect of the present invention, there is provided a recording liquid for ink jet recording system comprising a liquid composition containing a disperse dye and a liquid medium, the purity of said dispersion dye being 90% by weight, or higher.

DETAILED DESCRIPTION OF THE PREFERRED EMBODIMENTS

In the course of a research for attaining the above-mentioned object, the present inventors have investigated the influence of impurities in the commercially available dyes, particularly those in disperse dyes, based on an observation that the aforementioned troubles are often caused by organic and inorganic impurities in the commercial dyes, such as unreacted substances which are still somewhat reactive, reaction by-products, dispersants, dyeing aids etc., and have achieved the present invention through a finding that the clogging in pen tips, nozzles or orifices, the sediment formation during storage, or the deposit formation particularly in the thermal head of an ink jet recording process utilizing thermal energy are caused principally by unreacted substances or reaction by-products in the ink resulting from the manufacture of dyes.

More specifically, a first feature of the present invention is the use of a disperse dye as the coloring component for ink, and a second feature is the use of a disperse dye with a purity not lower than 90 wt. %.

Investigations on the recording on various recording materials with writing tools and on the print dyeing on textiles indicate that the aforementioned troubles in the apparatus or the insufficient dispersion stability of the disperse dyes in the ink are principally caused by the presence of various impurities in the disperse dyes employed in the preparation of the ink, particularly unreacted substances and reaction by-products resulting from the manufacture of the dyes. Consequently the principal object of the present invention can be achieved by maintaining the amount of such impurities at a predetermined level or lower.

Disperse dyes, constituting the first feature of the present invention and employed therein, are themselves already known and include water-insoluble azo-type, anthraquinone-type, and other types of dyes widely utilized in fiber dyeing or in sublimation transfer technology. Such disperse dyes do not contain water-soluble groups such as sulfonic acid radicals or carboxyl radicals in the molecular structure, have molecular weights in a roughly defined certain range, and can be fixed on synthetic fibers such as polyester or acetate fiber by exposition to a temperature of 80°-250° C. during or after the application of aqueous dispersion of such dyes onto fibers or a textile.

Any of known disperse dyes may be used in the present invention. Preferable disperse dyes for the present invention include:

C. I. Disperse Yellow 3, 4, 5, 7, 9, 13, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 114, 116, 118, 119, 122, 124, 126, 135, 140, 141, 149, 160, 162, 163, 164, 165, 179, 180, 182, 183, 186, 192, 198, 199, 202, 204, 210, 211, 215, 216, 218, 224

C. I. Disperse Orange 1, 3, 5, 7, 11, 13, 17, 20, 21, 25, 29, 30, 31, 32, 33, 37, 38, 42, 43, 44, 45, 47, 48, 49, 50, 53, 54, 55, 56, 57, 58, 59, 61, 66, 71, 73, 76, 78, 80, 89, 90, 91, 93, 96, 97, 119, 127, 130, 139, 142;

C. I. Disperse Red 1, 4, 5, 7, 11, 12, 13, 15, 17, 27, 43, 44, 50, 52, 53, 54, 55, 56, 58, 59, 60, 65, 72, 73 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 296, 303, 310, 311, 312, 320, 324, 328;

C. I. Disperse Violet 1, 4, 8, 23, 26, 27, 28, 31, 33, 35, 36, 38, 40, 43, 46, 48, 50, 51, 52, 56, 57, 59, 61, 63, 69, 77;

C. I. Disperse Green 9;

C. I. Disperse Brown 1, 2, 4, 9, 13, 19,;

C.I. Disperse Blue, 3, 7, 9, 14, 16, 19, 20, 26, 27, 35, 43, 44, 54, 55, 56, 58, 60, 62, 64, 70, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333;

C. I. Disperse Black 1, 3, 10, 24;

Kayacelon Red E-GL, Kayacelon Blue E-TB, Kayacelon Navy Blue E - E X, Kayacelon Black E- EX Such commercial disperse dyes are given a C.I. number respectively, but are seldom pure and usually contain large amounts of inorganic salts, polyvalent metal salts, dyeing aids, and unreacted substances and reaction by-products resulting from the dye synthesis. Investigations of the present inventors indicate that the aforementioned troubles in recording by ink jet process or with writing tools or in print dyeing are principally caused by such impurities, particularly water-insoluble unreacted substances or reaction by-products, which in particular give rise to the formation of an undesirable deposit on the essential heating elements in an ink jet recording process utilizing thermal energy for ejecting the ink from nozzles. Consequently, according to the present invention, commercial disperse dyes have to be purified to a purity of 90 wt. % or higher, unless they have sufficient purity in advance.

Purification of such disperse dyes can be conducted with already known purifying methods such as washing with water or organic solvents, fractional precipitation, recrystallization, or combinations thereof, and the purity can be measured with already known methods such as thin layer chromatography, high-speed liquid chromatography, UV or visible spectroscopy etc.

The liquid medium for dispersing or dissolving the above-mentioned disperse dyes in the present invention can be any liquid medium employed in conventional inks preferably water and/or water-soluble organic solvents. Examples of such liquid medium are alkyl alcohols with 1 to 4 carbon atoms such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethyl acetamide; ketones and keto-alcohols such as acetone and diacetonealcohol; ethers such as tetrahydrofuran and dioxane; polyalkyleneglycols such as polyethylene glycol and polypropylene glycol; alkylene glycols containing 2 to 6 carbon atoms in the alkylene radical such as ethylene glycol, propylene glycol, butylene glycol, triethylene glycol, 1,2,6-hexanetriol, thiodiglycol, hexyleneglycol, and diethylene glycol; glycerin; lower alkylethers of polyhydric alcohols such as ethylene glycol methyl(or ethyl)ether, diethylene glycol methyl(or ethyl)ether and triethyleneglycol monomethyl(or ethyl)ether; N-methyl-2-pyrrolidone; and 1,3-dimethyl-2-imidazolidinone.

The above-mentioned mediums can be employed singly or as a mixture, but the most preferably composition of the liquid medium consists of water and at least one water-soluble organic solvent, containing at least a water-soluble high-boiling organic solvent, for example a polyhydric alcohol such as ethyleneglycol, propyleneglycol or glycerin. Also an ink in which the disperse dye is dissolved, is preferably almost free of water and composed solely of solvents capable of satisfactorily dissolving the disperse dye. Such liquid medium is employed in such an amount as to obtain a concentration of said disperse dyes in a range from ca. 0.1 to 15 wt.% in the ink composition.

In addition to be foregoing essential components, the ink of the present invention may further contain a known dispersant, a surfactant or a viscosifier according to the necessity.

Examples of dispersants or surfactants eventually employed include anionic surfactants or dispersants such as fatty acid salts, alkylsulfonate ester salt, alkylbenzenesulfonate salts, alkylnaphthalenesulfonate salts, dalkylsulfosuccinate salts, alkylphosphate ester salts, naphthalenesulfonate-formaldehyde condensates or polyoxyethylenealkylsulfonate ester salts; and nonionic dispersants and surfactants such as polyoxyethylene alkylether, polyoxyethylene alkylphenylether, polyoxyethylene fatty acid ester, sorbitan fatty acid ester, polyoxyethylene sorbitan fatty acid ester polyoxyethylenealkylamine, glycerin fatty acid ester, and oxyethyleneoxypropylene block polymer.

The viscosifier is preferably a natural or synthetic water-soluble high-molecular substances such as carboxymethyl cellulose, sodium polyacrylate, polyvinylpyrrolidone, gum arabic, and starch, and the viscosity of the ink of the present invention at 25° C. is adjusted to 50 cps or lower preferably 20 cps or lower, with or without said viscosifier.

Into the ink to be employed in an ink jet recording process where the ink is electrostatically charged, there is added a specific resistivity adjusting material such as lithium chloride, ammonium chloride or sodium chloride.

In the ink to be employed in an ink jet process where the ink is ejected by the function of thermal energy, there may be adjusted thermal properties such as specific heat, thermal expansion coefficient and thermal conductivity.

In addition to the three kinds of additives mentioned above, there may be further added other materials such as a defoamer, a penetrant, an antimold agent, a pH adjusting agent etc.

The ink of the present invention can be generally obtained by mixing the above-mentioned essential and additional components and crushing said components in known crushing means such as a ball mill, a sand mill or a speed line mill, and the particle size of the disperse dye is maintained at 30 microns or lower, preferably 20 microns or lower. An excessively large particle size results in clogging of the pen tip or the nozzle in recording, or in insufficient level dyeing in the use of ink in a print dyeing process. On the other hand, when a liquid medium capable of dissolving the disperse dye is selected, the ink of the present invention can be obtained by a simple dissolving operation for example by heating.

If the purity of the employed disperse dye is less than 90 wt. %, the ink of the present invention may cause clogging of the pen tip or the nozzle, and it may also cause an inferior ejection stability of the ink, a deteriorated stability of dispersion or dissolution of the ink itself, or insufficient level dyeing in the use of the ink in print dyeing. These drawbacks can be easily solved if the purity is equal to or higher than 90 wt. %.

The above-explained ink of the present invention, being free from the drawbacks of the prior art, is particularly useful for ink-jet print dyeing of textile and non-woven cloth such as those composed of synthetic fibers, such as polyester fibers, acetate fibers, polypropylene fibers, vinylon fibers or polyamide fibers, and those composed of such synthetic fibers and other fibers, for example, cotton fibers. Such textile or nonwoven woven cloth may be employed in the already known form, or may be subjected to a preliminary treatment for facilitating ink-jet print dyeing. Such treatment can be conducted by applying, to the surface of the fibers constituting the textile or cloth, a water-soluble or water-dispersible polymer capable of rapidly absorbing and retaining the ink. Also the ink of the present invention can be effectively utilized for forming characters or patterns on paper, coated paper, plastic sheet, film or molded products of polyester, acetate, polypropylene, nylon etc.

The ink jet recording proces to be employed for depositing the ink of the present invention onto paper, coated paper, plastic film, sheet, textile non-woven cloth or molded product can be any process capable of effectively ejecting the ink from a nozzle and depositing said ink onto the above-mentioned object, and representative examples of such process are described in IEEE Transactions on Industry Applications, vol. IA-13, No. 1 (Feb/Mar. Issue, 1977); and Nikkei Electronics, Apr. 19, 1974 issue, Jan. 29, 1973 issue and May 6, 1974 issue. The processes described therein are suitable for the use of the ink of the present invention.

One of said processes is at electrostatic attraction process, including a process of applying a strong electric field between a nozzle and an accelerating electrode placed several millimeters in front of said nozzle to extract ink droplets in succession from the nozzle and supplying information signal to deflecting electrodes while thus extracted ink droplets fly between said deflecting electrodes to form a record, and another process of ejecting ink droplets according to the information signal without deflection of the ink droplets, both being suitable for the use of the ink of the present invention.

A second process comprises application of high pressure to the ink with a small pump and mechanically vibrating a nozzle for example with a crystal vibrator to forcibly eject ink droplets. Simultaneously with the ejection, the ink droplets are charged according to information signal, and the charged ink droplets are deflected according to the amounts of charge, while passing between deflecting electrodes. A variation of this process is the one called a micro-dot ink jet process, in which the ink pressure and the vibrating condition are maintained within a certain range to generate ink droplets in two different sizes, and the smaller droplets alone are utilized for recording. This process is characterized by a fact that very small droplets can be generated from a large nozzle of conventional use.

In a third process, a piezoelectric element process, a piezoelectric element is utilized for applying a pressure to the ink, instead of mechanical means such as a pump. An electric signal applied to the piezoelectric element causes a mechanical distortion therein to apply a pressure to the ink and to cause a nozzle to eject said ink.

In addition the ink of the present invention is suitable for use, with excellent ejection stability, in an ink jet recording process disclosed in the Japanese Patent Laid-open No. 59936/1979, in which the ink subjected to an action of a thermal energy causes a rapid change in volume, and is ejected from a nozzle by the force caused by said change in state.

Any of the above-mentioned ink jet recording processes can be employed for forming characters or patterns by the ink deposited onto paper, coated paper, plastic film or sheet, textile, non-woven cloth or molded product, and the ink of the present invention shows excellent ejection stability, without clogging of the pen tip or the nozzle as is encountered in the prior art, since the purity of the dispersion dye is maintained above a predetermined level. Also it shows excellent uniform recording or dyeing.

Also the ink of the present invention, when applied to the print dyeing of a textile as explained above, can form sharp and fine patterns through a fixing step achieved by a subsequent heat treatment. In contrast, the conventional ink not only causes the above-mentioned troubles but also is hardly capable of forming fine patterns on the textile due to inferior level dyeing properties.

As explained above the ink of the present invention can be deposited in accordance with image signals onto paper, coated paper, plastic film or sheet, or textile, while subsequent heat treatment is required in case of plastic film, sheet or textile because the disperse dye of the ink is merely attached thereon. Such heat treatment can be conducted in a conventional manner, for example by passing the recorded or dyed film etc. between heating rollers to heat it to 120-250° C. for several seconds to several tens of seconds, or by passing it through a superheated steam chamber, thereby heating the disperse dye of the ink to a temperature and for a duration necessary for fixing the dye to the polyester or other resin constituting the dilm or textile.

The above-explained ink of the present invention is useful for recording or printing with writing tools or with ink jet recording processes not only on paper or coated paper but also on hydrophobic plastics such as films, sheets, textiles or non-woven cloths composed of polyester. The conventional ink-jet recording on a polyester sheet or the like utilizes an ink of a watersoluble dye and therefore requires an ink receiving layer having hydrophilicity on the surface of the polyester sheet, for the purpose of absorbing and retaining the ink. Consequently the abrasion resistance of the recording face has been a problem. On the other hand, the ink of the present invention is free from such drawback since it is fixed within the polyester film, and moreover it results in further improvements in sharpness and transparency.

In the following the present invention will be further clarified by examples thereof, in which the quantities and percentages are based on weight.

EXAMPLE 1

Following components:

| | |
|---|---|
| Disperse dye (C.I. Disperse Blue 187) (purity 95%) | 5 parts |
| Anionic surfactant (dispersant) (trade name Demol-N; made by Kao Corp.) | 4 parts |
| Ethyleneglycol | 15 parts |
| Diethyleneglycol | 13 parts |
| Water | 65 parts | were subjected to dispersion treatment for ca. 36 hrs. in an alumina ball mill, pH of the dispersion was adjusted to 8.3 with sodium hydroxide then the mixture is subjected again to dispersion treatment in an alumina ball mill for three hours, and filtered through a filter (trade name: Fluoropore Filter FP-100, made by Sumitomo Denko Co., Ltd.) for removing large particles of 10 microns or larger, to obtain the aqueous ink (A) of the present invention.

EXAMPLE 2

Following components:

| Disperse dye (C.I. Disperse Orange 55) (purity 99%) | 3 parts |
| --- | --- |
| Acid dye (C.I. Acid Yellow 49) | 1 part |
| Anionic surfactant (trade name; Nikkol OTP-100s, made by Nikko Chemicals Co., Ltd.) | 0.5 parts |
| Anionic surfactant (trade name: Demol-C, made by Kao Soap Co., Ltd) | 1.5 parts |
| Nonionic surfactant (trade name: Emulgen 911, made by Kao Corp.) | 0.2 Parts |
| Isopropyl alcohol | 0.5 parts |
| Propyleneglycol | 15 parts |
| Polyethyleneglycol 400 | 5 parts |
| Water | 75 parts | were subjected to dispersion treatment for about 40 hrs. in an alumina ball mill, them the pH of the dispersion was adjusted to 7.4 with sodium hydroxide, again subjected dispersion treatment for further 2 hrs., and filtered with a filter (trade name: Fluoropore Filter FP-500, made by Sumitomo Denko Co., Ltd.) for removing large particles exceeding 5 microns, to obtain the aqueous ink (B) of the present invention.

EXAMPLE 3

Following components:

| Disperse dye (C.I. Disperse Red 111) (purity 92%) | 7 parts |
| --- | --- |
| Reactive dye (C.I. Disperse Red 80) | 2 parts |
| Nonionic surfactant (trade name: Emulgen 707, made by Kao Corp.) | 1.5 parts |
| Nonionic surfactant (trade name: Leodol TW-P120, made by Kao Corp.) | 2.0 parts |
| Ethyl carbitol | 20 parts |
| Water | 70 parts | were processed in the same manner as in the example 2 to obtain aqueous ink (C) of the present invention.

EXAMPLE 4

| Dispersion dye (C.I. Disperse Orange 76) (purity 95% or higher) | 2 parts |
| --- | --- |
| Dispersion dye (C.I. Disperse Red 60) (purity 95% or higher) | 2 parts |
| Ethanol | 40 parts |
| Triethyleneglycol monobutylether | 30 parts |
| Triethyleneglycol | 26 parts | were mixed to obtain the ink (D) of a dye of dissolution type of the present invention.

REFERENCE EXAMPLE 1

The process of the Example 1 was repeated with C.I. Disperse blue 187 of a purity of 80% to obtain the reference ink (E).

REFERENCE EXAMPLE 2

The process of the Example 2 was repeated with C.I. Disperse Orange 55 of a purity of 88% to obtain the reference ink (F).

Properties of the inks A-F of the Examples 1-4 and the Reference Examples 1-2 are summarized in Table 1.

USE EXAMMPLES 1

Aqueous inks A-F of the Examples 1-4 and the Reference Examples 1-2 were used in continuous printing of $10^7$ dots on a georgette cloth of polyester 100%, employing 10 nozzles each of (1) an ink jet printer BJ-80 made by Canon INC. and utilizing the thermal energy ink jet process disclosed in the Japanese Patent Laid-Open No. 59936/1979, and (2) an ink jet printer PJ-1080A with a nozzle of 65 microns in diameter, made by Canon and utilizing a piezoelectric element. 100 ml each of the inks A-F was stored for 1 week at 40° C. in glass bottle for evaluating the storage stability. Results are summarized in Table 2.

Also the inks A-D of the Examples 1-4 were employed for printing on an ink jet printer PJ-1080A with a nozzle of 65 micronns in diameters, made by Canon INC. and utilizing a piezoelectric element, on a georgette cloth of polyester 100%, which was fixed then by heating for 3 minutes in an oven of 215° C., then washed with a neutral detergent to obtain a clearly printed cloth.

USE EXAMPLE 2

Inks A-F of Examples 1-4 and Reference Examples 1-2 were used in the same ink jet printer BJ-80 of Canon INC. employing thermal energy as in the Use Example 1 to effect continuous printing over the entire area of a commercial OHP copy film (tade name NP-DRY transparency, made by Canon Trading Co.) of A4 size. The inks A-D provided stable ejection even after printing of 20 sheets, and can be completely fixed on the film by passing the same through heating rollers of 105° C. On the other hand the reference inks E and F respectively produced defective printing in a 3rd sheet and a 12th sheet.

The printer heads were disassembled and the heat-generating portions were observed. It was found that the heads having used for Inks E and F were denatured and colored black due to deposited matter, while the heads used for Inks A to D did not show abnormailty.

USE EXAMPLE 3

Inks A-F of the Examples 1-4 and the Reference Examples 1-2, each 2 grs., were filled into commercially available ball-point pens (trade name; Uni-Ball, made by Mitsubishi Pencil Co.) in place of normal inks and were used for hand-writing until the ink does not flow out. The pens filled with the inks A-D showed remaining ink of 0.3 gr. each, but those filled with the inks E, F showed remaining ink of 1.3 gr or more respectively, with an ink supply part clogged.

TABLE 1

| Ink | Examples | | | | Reference Example | |
| --- | --- | --- | --- | --- | --- | --- |
|  | A | B | C | D | E | F |
| Surface tension (dyne/cm) | 46 | 55 | 42 | 35 | 44 | 54 |
| pH | 8.3 | 7.5 | 5.1 | — | 8.3 | 7.5 |
| Polyvalent metal[*1] concentration (ppm) | 81 | 45 | 63 | 78 | 130 | 49 |

TABLE 1-continued

| Ink | Examples | | | | Reference Example | |
|---|---|---|---|---|---|---|
| | A | B | C | D | E | F |
| Max. particles size (μm)*2 | 11 | 6 | 4 | 1 | 11 | 6 |

*1 Analysis by induction-coupled plasma emission spectroscopy
*2 Analysis by Coulter counter

TABLE 2

| Ink | Example | | | | Reference Example | |
|---|---|---|---|---|---|---|
| | A | B | C | D | E | F |
| Clogging*1 Printer (1) | 0 | 1 | 0 | 0 | 10 | 7 |
| Printer (2) | 0 | 0 | 0 | 0 | 9 | 5 |
| Storage stability*2 | 0 | 0 | 0 | 0 | X | X |

*1 Number of clogged nozzles out of 10 nozzles in continuous printing of $10^7$ dots for each nozzle
*2 Occurrence of foreign matter visually observed in the glass bottle after storage of ink for 1 week at 40° C., 0: none, X: occurrence of foreign matter

What is claimed is:

1. A recording liquid comprising a liquid composition containing a disperse dye, the purity of said disperse dye being 90% by weight or higher.

2. A recording liquid according to claim 1, wherein said liquid composition contains a liquid medium in addition to said disperse dye.

3. A recording liquid according to claim 2, wherein said liquid medium is water.

4. A recording liquid according to claim 2, wherein said liquid medium is a mixture of water and a water-soluble organic solvent.

5. A recording liquid according to claim 1, wherein said liquid composition contains said disperse dye in a proportion ranging from 0.1 to 15% by weight.

6. A recording liquid according to claim 1, wherein said disperse dye is comprised of particles having diameters of 30 microns or less.

7. A recording liquid according to claim 1, wherein said disperse dye is comprised by particles having diameters of 20 microns or less.

8. A recording liquid according to claim 1, wherein said disperse dye is a purified one.

9. A recording liquid for ink jet recording process comprising a liquid composition containing a disperse dye and a liquid medium, the purity of said dye being 90% by weight or higher.

10. A recording liquid according to claim 9, wherein said liquid medium is water.

11. A recording liquid according to claim 9, wherein said liquid medium is a mixture of water and a water-soluble organic solvent.

12. A recording liquid according to claim 9, wherein said liquid composition contains said disperse dye in a proportion ranging from 0.1 to 15% by weight.

13. A recording liquid according to claim 9, wherein said disperse dye is comprised of particles having diameters 30 microns or less.

14. A recording liquid according to claim 9, wherein said disperse dye is comprised of particles having diameters 20 microns or less.

15. A recording liquid according to claim 9, wherein said disperse dye is purified one.

16. A recording liquid according to claim 9, wherein said ink jet recording process utilizes thermal energy applied to ink.

17. A recording liquid according to claim 1, wherein said liquid composition further contains a surfactant.

18. A recording liquid according to claim 1, wherein said liquid composition has a viscosity 50 cps or less at 25° C.

19. A recording liquid according to claim 9, wherein said liquid composition further contains a surfactant.

20. A recording liquid according to claim 9, wherein said liquid composition has a viscosity 50 cps or less at 25° C.

* * * * *

UNITED STATES PATENT AND TRADEMARK OFFICE
CERTIFICATE OF CORRECTION

PATENT NO. : 4,689,078
DATED : August 25, 1987
INVENTOR(S) : SHOJI KOIKE, ET AL.

It is certified that error appears in the above-identified patent and that said Letters Patent is hereby corrected as shown below:

COLUMN 3

Line 7, "Blue, 3," should read --Blue 3,--.

COLUMN 4

Line 13, "eventually" should read --generally--.

COLUMN 5

Line 29, "19, 1974" should read --19, 1976--.

COLUMN 9

Line 22, "liguid" should read --liquid--.

UNITED STATES PATENT AND TRADEMARK OFFICE
CERTIFICATE OF CORRECTION

PATENT NO. : 4,689,078

DATED : August 25, 1987

INVENTOR(S) : SHOJI KOIKE, ET AL.

Page 2 of 2

It is certified that error appears in the above-identified patent and that said Letters Patent is hereby corrected as shown below:

COLUMN 10

Line 20, "eters 30" should read --eters of 30--.
Line 23, "eters 20" should read --eters of 20--.

Signed and Sealed this

Twenty-ninth Day of December, 1987

Attest:

DONALD J. QUIGG

*Attesting Officer*    *Commissioner of Patents and Trademarks*